June 4, 1968 R. A. BINA 3,387,280

AUTOMATIC PACKING AND UNPACKING OF ESI TRANSFERS

Filed Oct. 4, 1965 3 Sheets-Sheet 1

INVENTOR

Robert A. Bina

BY Griffin and Branigan

ATTORNEYS

AUTOMATIC PACKING AND UNPACKING OF ESI TRANSFERS

Filed Oct. 4, 1965 3 Sheets-Sheet 2

INVENTOR
Robert A. Binn
BY Griffin and Branigan
ATTORNEYS

AUTOMATIC PACKING AND UNPACKING OF ESI TRANSFERS

INVENTOR

Robert A. Bina

BY Griffin and Branigan

ATTORNEYS

United States Patent Office 3,387,280
Patented June 4, 1968

3,387,280
AUTOMATIC PACKING AND UNPACKING OF ESI TRANSFERS

Robert A. Bina, South St. Paul, Minn., assignor to Sperry Rand Corporation, New York, N.Y., a corporation of Delaware Filed Oct. 4, 1965, Ser. No. 492,377
12 Claims. (Cl. 340—172.5)

ABSTRACT OF THE DISCLOSURE

A device for transferring half words between an external data handling device and the main memory of a central data processor, the arrangement being such that two half words are stored in or are read out of, each memory address. For a transfer into the memory from the external device, the external device applies a full word to the data processor. One half of the word represents data and the other half represents the address of a control word which controls the entry of the data into memory. The control word has a current address portion, a half word indicator bit, a word count portion, and a count control portion. Gating means are provided so that the input data can be transferred to either the upper half or the lower half of the address as determined by the half word indicator bit. Each time the control word is withdrawn from memory the indicator bit is changed so that two successive half words are entered into the lower half and then the upper half of a memory location. Each time the control word is withdrawn from memory the word count portion of the control word is decremented, and the transfers are terminated when the word count reaches zero. Every other time the control word is withdrawn from memory the current address portion must be modified. The current address portion is either incremented by one or decremented by one depending upon which operation is specified by the count control portion of the control word. The control circuitry operates in a similar manner to control half word transfers from the memory to the external device.

The present invention relates to circuits for controlling the transfer of data between the main memory of a central data processor and one or more external data handling devices. More particularly, the present invention provides improved means for performing data transfers in the externally specified index mode.

Copending application Ser. No. 143,425, filed Oct. 6, 1961, now Patent No. 3,243,781, discloses a system for executing input and output transfers in the externally specified index (ESI) mode. In that system the external data handling devices are connected to the central data processor by input and output channels, with each channel having a plurality of leads thus enabling the parallel transfer of data signals. A control word is associated with each channel. The control words are stored in the main memory of the central processor and each control word contains a current address and a terminating address. An input transfer is initiated by the external data handling device by placing an input word on the associated input channel and signalling the central processor with an input request. The input word has two parts. The upper half of the input word represents the data to be stored in the main memory and the lower half of the input word represents the address of the control word associated with the channel.

The input request is processed by priority circuits and when the request is granted the address portion of the input word is applied to the memory addressing circuits to withdraw the control word from memory. The current address portion of the control word is used to address the memory and the data portion of the input word is stored in the upper half of the addressed memory location. The current address portion of the control word is updated, compared with the terminal address portion and the control word is returned to its original storage location. This completes one ESI transfer. Each succeeding input request is processed in the same manner, the only difference being that on each succeeding transfer the data portion of the input word is stored in the upper half of the memory address specified by the updated current address portion of the control word. When the current address portion of the control word is compared and found equal to the terminal address portion a signal is sent to the control section of the central processor indicating that the block of memory addresses bounded by the initial current address and the terminal address of the control word has been filled with data.

The end result of the sequence of operations described above is a block of memory locations loaded with a half word in the upper half of each location. In order to conserve memory locations it is customary for programmers to program the central processor to "pack" the half words when a block of memory addresses has been filled. That is, the central processor is programmed so that when a block of memory locations has been filled a series of instructions are executed to transfer the half words in the upper halves of the memory addresses in the block to the lower halves of the same addresses. By using another control word with the same current address and terminating address as the initial control word the upper half of each memory location is again loaded with input data from the external data handling device.

While the above described programming procedure does pack the input data and conserve memory locations, it has several disadvantages. First, it requires extra time for the programmer to set up the packing routine. Secondly, since the routine is dependent upon the accuracy of the programmer, it introduces the possibility of human error. Thirdly, it reduces the effective speed of the central processor since the program of the central processor must be interrupted so that the packing routine may be performed. In addition, the programming method of packing reduces the effective rate of data transfer between the central processor and the external data handling device since the data transfers must be interrupted while the packing routine is being performed.

In order to maintain the data in proper sequence it is necessary to "unpack" the data before it is read out of the main memory to the external data handling unit. This is usually accomplished by reading out the lower half of each address of a block, one half-word at a time on a request basis. When the lower half of each address in a block has been read out the central processor is programmed to transfer the contents of the upper half of each address to the lower half. The lower half of each address of the block is then read out to the external data handling device on a request basis. Thus, each of the disadvantages enumerated above in connection with input transfers in the ESI mode is also present in connection with output transfers in the ESI mode.

Accordingly, an object of this invention is to provide means for automatically packing and unpacking data transferred in the ESI mode.

An object of this invention is to provide means for packing or unpacking data transferred in the ESI mode, said means operating independently of the central processor program once the channel has been activated.

A further object of this invention is to provide means for packing or unpacking data transferred in the ESI mode, said packing or unpacking occurring automatically as consecutive half-words are transferred.

Another object of this invention is to provide means for sequentially filling a block of addresses in main memory with half words of input data, said means operating to store input data in both halves of a memory address before storing any data in the next address of the block.

Yet another object of the invention is to provide means for sequentially transferring data to an external device from a block of addresses in memory, said means operating to transfer data a half word at a time with the half word in one half of a memory location being transferred next in sequence after the half word in the other half of the same memory location has been transferred.

Briefly, the above stated objects are accomplished by utilizing a control word having a current address portion, a half-word indicator bit, a word count portion and a count control portion. As in the system described in the above-mentioned copending application, the external data handling device supplies the address for withdrawing the control word from memory. Means are provided for storing the data portion of the input word in the memory location specified by the current address portion of the control word. However, gating means are provided so that the input data can be transferred to either the upper half or the lower half of the address as determined by the half-word indicator bit which may have either one of two values. Each time the control word is withdrawn from memory, the indicator bit is changed so that two successive half words are entered into the lower half and then the upper half of a memory location. Each time the control word is withdrawn from memory the word count portion of the control word is decremented, and the transfers are terminated when the word count reaches zero. In addition, it is necessary to modify the current address portion every alternate time the control word is withdrawn from memory. The value by which the current address is modified is determined by the count control portion and the half word indicator bit of the control word. If the count control portion specifies increase the current address is incremented by the value one when the half word bit indicates that the current input word is being stored in the upper half of a memory address. If the count control portion specifies decrease then the current address is decremented by the value one when the half word bit indicates that the current input word is being stored in the upper half of a memory address. For all other conditions, the control word is returned to its memory location with the current address portion unchanged.

The handling of the control word is substantially the same for output transfers. The only difference is that in response to each output request a half-word is read out of memory. The half word indicator bit controls a set of gates disposed between the memory buffer register and the output buffer register. When the indicator bit has one value the upper half of the memory address specified by the current address portion of the control word is gated to the lower half of the output buffer register and when the indicator bit has a second value the lower half of the memory address is gated to the lower half of the output buffer register.

The operation of the invention and its attendant advantages will be better understood by reference to the following description and the accompanying drawings wherein:

FIGS. 1A and 1B, when arranged as shown in FIG. 1C, show a block diagram of the invention;

In the embodiment of the invention illustrated herein, it is assumed that the word length is 36 binary bits.

For ease of reference, the lower order bits 0 through 17 are referred to as the lower half word and the higher order bits 18 through 35 are referred to as the upper half word. In like manner, when reference is made to the lower half or upper half of a register it means the lower eighteen or upper eighteen orders, respectively, of the register.

Figure 1A:
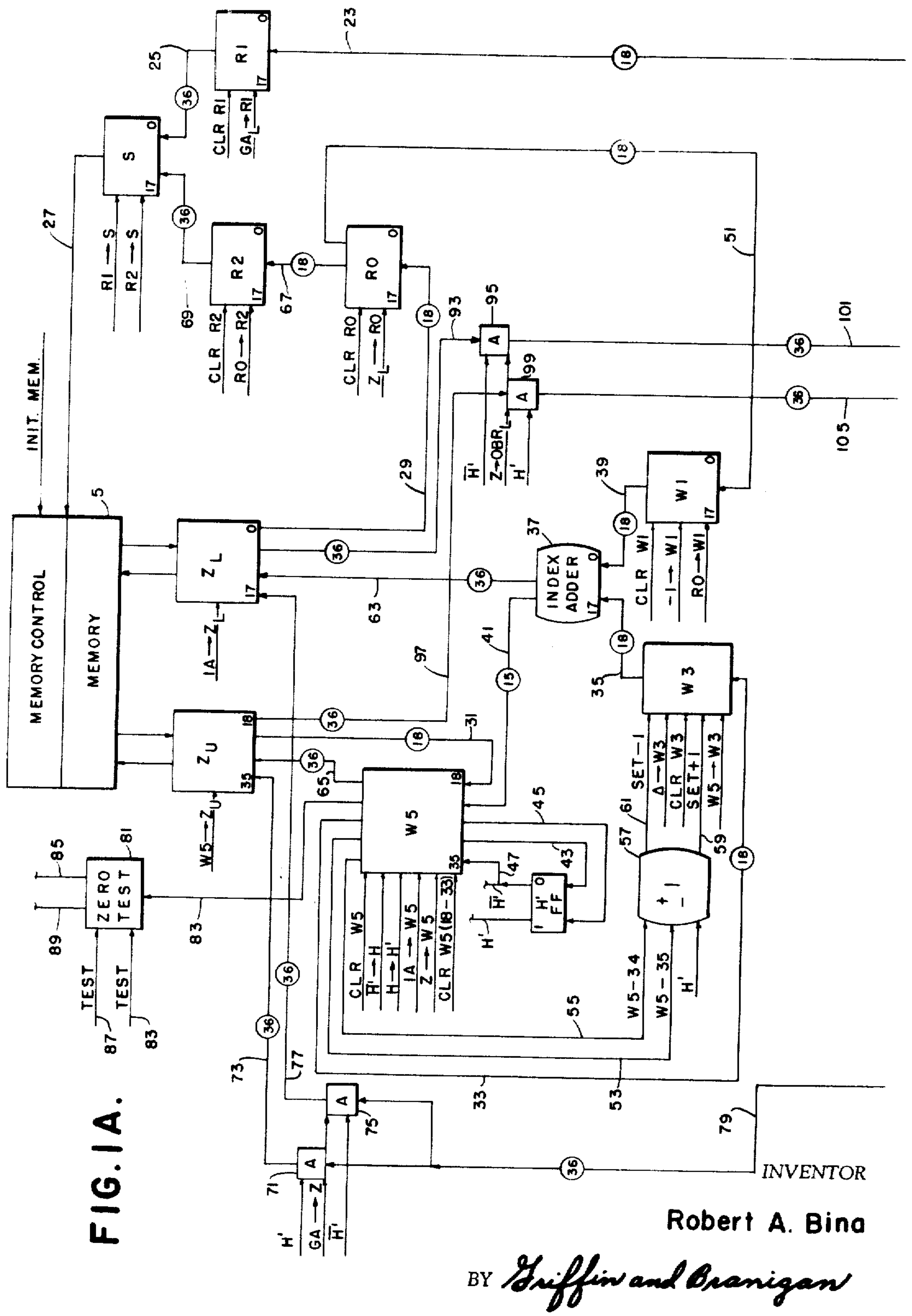
Figures 1B, 1C, 2, 3, 4:
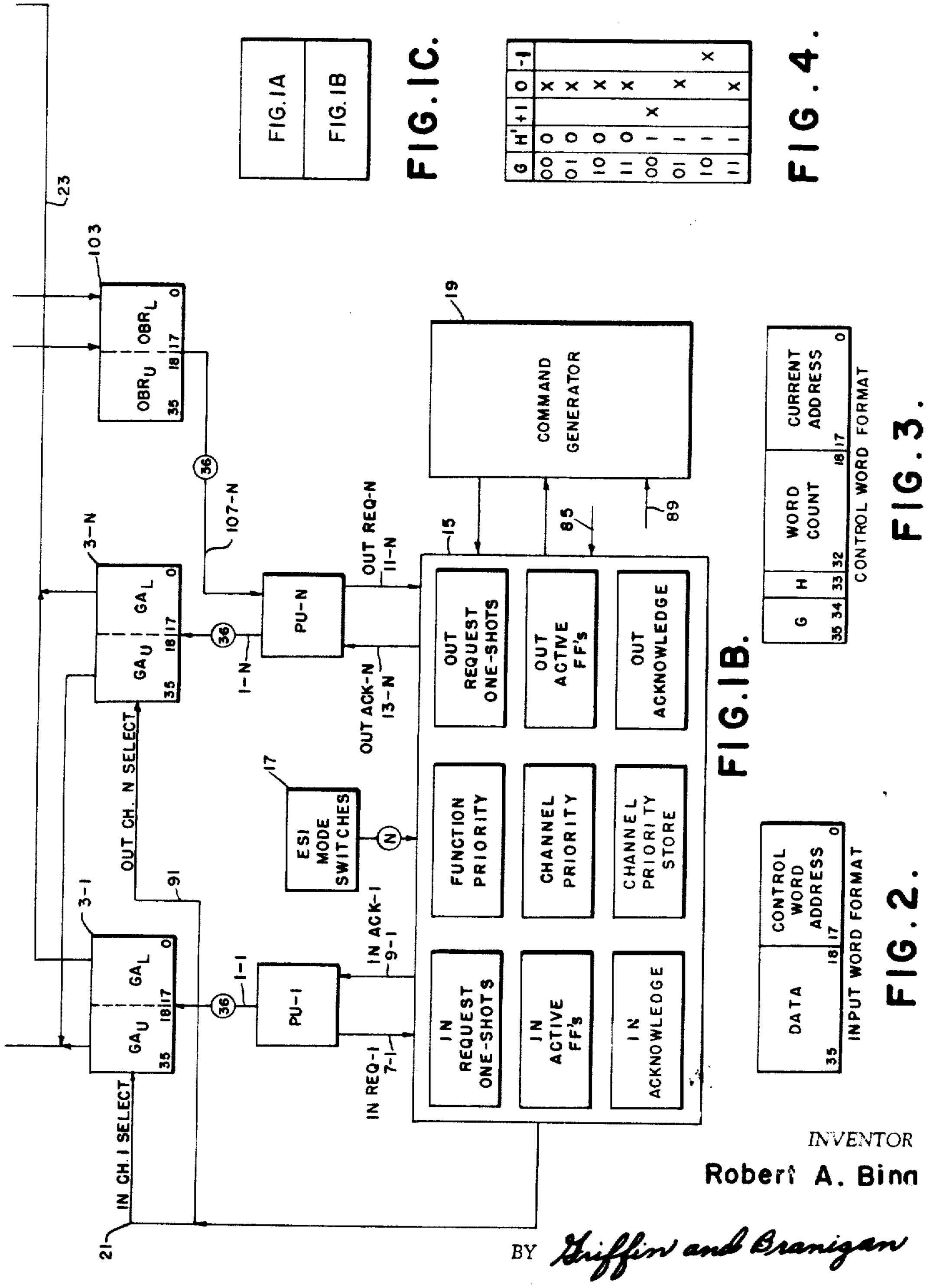
FIG. 2 shows the format of an input word.
FIG. 3 shows the format of a control word.
FIG. 4 is a chart summarizing the operation of the current address modifier circuits; and, FIG. 5 is a timing diagram illustrating the sequence of occurrence of various signals and commands.

FIGS. 1A and 1B show a data processing system including a central processor and two external data handling devices or peripheral units designated PU–1 and PU–N. PU–1 is shown as an input device and PU–N is shown as an output device. That is, PU–1 supplies input data to the central processor and PU–N receives output data from the central processor. Additional input and output units may be added as desired. Furthermore, it will be understood that a particular peripheral unit may include means for alternatively accepting data from the central processor or supplying data thereto but the unit may not be set up for simultaneously executing both input and output buffers.

Since it is assumed that full words contain 36 binary bits each peripheral unit is shown connected to the central processor by means of an input channel having thirty-six parallel paths for the simultaneous transmission of thirty-six bits. PU–1 is connected by means of an input channel 1—1 to a first set of gated amplifiers 3—1 and PU–N is connected by means of an input channel 1–N to a second set of gated amplifiers 3–N.

Data is actually transferred between the central processor and the peripheral units as 18-bit half words. When operating in the ESI mode the peripheral unit making a transfer request must supply the address of a buffer control word which in turn contains the address in the central processor memory 5 to or from which data is to be transferred. The lower 18 bits of each input channel are employed for transferring the control word address from the peripheral unit to the central computer. The format of an input word is shown in FIG. 2.

As explained in the aforementioned copending application hereinafter referred to as copending application A, no transfers may take place over an input or output channel until after the particular channel has been activated. This is accomplished by the central processor by executing an Output Buffer instruction. The Output Buffer instruction specifies the input or output channel to be activated, loads the buffer control word into a central memory address associated with the channel, and sets either an In Active or an Out Active flip-flop depending upon whether the channel is an input or an output channel. There is an "active" flip-flop for each channel and no transfers may take place over a channel unless the active flip-flop associated with that channel is set. This is explained in copending application A to which reference may be made for a more specific description.

The peripheral units communicate with the central processor on a request-acknowledge basis. When a peripheral unit such as PU–1 is ready to transfer an input word to the central processor it loads the input word on the input channel 1—1 and sends an In Request to the central processor over a lead 7–1. When the central processor has stored the data in memory it sends an In-Acknowledge signal to the peripheral unit over a lead 9–1. This frees the peripheral unit to load another input word on the input channel.

When a peripheral unit is ready to accept a word from the central processor it sends an Out Request to the processor over a lead 11–N. The central processor responds by withdrawing a word from memory, entering it into an output buffer register, and sending an Out-Acknowledge signal to the peripheral unit over a lead 13–N. Upon receipt of the Out-Acknowledge signal the peripheral unit is activated to receive the word in the output buffer register.

Since several peripheral units may desire to communicate with the central processor memory simultaneously, the request and acknowledge signals are all processed by priority circuit 15. Priority circuit 15 includes In Request One-Shots, Out Request One-Shots, In Active Flip-flops Out Active Flip-flops, In-Acknowledge controls, Out-Acknowledge controls, Function Priority circuits, Channel Priority circuits, and a Channel Priority Store. The elements within priority circuit 15 may be of the type disclosed in copending application A and reference may be made to that application for a more complete description of how the circuits may be interconnected. There is an ESI mode switch 17 associated with each channel. The outputs from these switches are applied to the priority circuits 15 in the manner explained in copending application A to cause the device to operate in the ESI rather than in the internally specified index (ISI) mode.

A command generator 19 receives signals from priority circuits 15 and supplies control signals to the priority circuits as well as other elements of the central processor. The details of the command generator are not shown since it may include conventional logic elements and may vary in detail depending upon the particular system in which the present invention is incorporated. Generally speaking, the command generator includes means such as that disclosed in copending application A for cyclically executing Scan cycles. During each of these cycles the command generator issues commands to the priority circuits to: scan all the outputs of the In Request and Out Request One-Shots to sense any transfer requests; control the function priority circuits to allot priority to those channels requesting transfers of the type having the highest priority; control the channel priority circuits to allot priority to one of the channels requesting a transfer of the type allotted priority by the function priority circuits; and store an indication of the channel which is granted priority.

When a particular channel is granted priority and the mode switch for that channel is set for the ESI mode, the priority circuits send a signal to the command generator causing it to execute a sequence of three cycles designated the RC cycle, the WC cycle, and the R/W cycle. See FIG. 5. During the RC cycle the control word for the channel granted priority is read from the memory address specified by the address portion of the input word supplied by the channel. During the WC cycle this control word is updated and written back into the memory location from which it was withdrawn. During the R/W cycle, data is either read from or written into the memory at the location specified by the current address portion of the control word.

Figure 5:
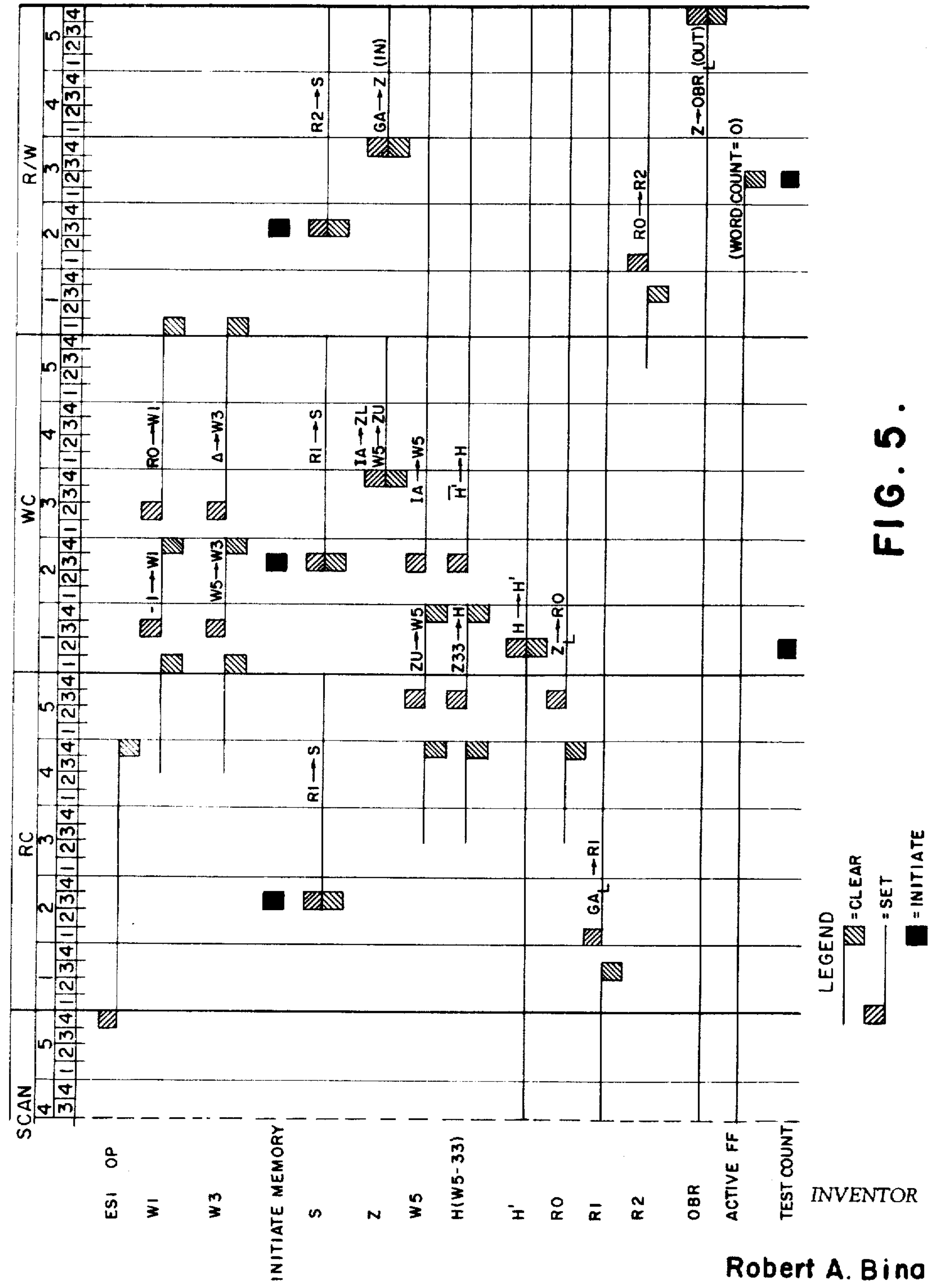

FIG. 5 shows the sequence in which signals are generated by the command generator during the RC, WC, and R/W cycles. Each cycle is divided into five subcycles each having four phases and in the following description a short notation is used to identify each distinct phase. For example, the notation WC3.2 designates phase two of the third subcycle in the Write Control cycle.

FIG. 3 shows the format of the buffer control word associated with each channel. The control word contains an 18-bit current address portion, a 15-bit word count portion, a single bit half-word count, and a 2-bit count control portion. As previously explained, the control word is initially loaded into memory at a particular address associated with the input or output channel which is activated.

Assume that the control word is associated with a peripheral unit such as PU–1 which is set up for input transfers over the channel 1—1. Initially, the current address portion of the control word specifies, the address in memory in which the first half word of data from PU–1 is to be stored. The half word count H specifies whether the first half word is to be stored in the upper or lower half of the current address, and the word count portion of the control word specifies the number of half-words of data which may be stored under the control of this particular control word. The count control portion G of the control word specifies whether data is to be stored in the memory at ascending or descending addresses.

When PU–1 is ready to transfer the first half word to the central processor memory it places an input word having the format shown in FIG. 2 on the input channel 1—1 and sends an input request to the priority circuits 15. When the input request is honored the control word address portion of the input word is used to address the central processor memory and withdraw the control word. The control word is updated and returned to memory. However, the current address portion of the control word is saved and used to subsequently address memory. The half word count bit is also saved. The data portion of the input word is then stored in either the upper or lower half of this address depending upon the value of the half word count bit. After the data is stored, an In-Acknowledge signal is sent to PU–1 thus freeing PU-1 to load another input word on the channel 1—1 and make another input request.

The updating of the control word occurs each time the word is withdrawn from memory and involves three distinct operations. First, the value of the half word count bit is changed so that half words received from the peripheral device are alternately gated to the upper and lower halves of memory addresses. Second the word count is decremented by 1 to keep track of the number of data transfers remaining to be carried out under the control of this particular control word. After the word count is decremented it is tested to see if it has a zero value. If it does, the central processor supplies a signal to reset the channel "active" flip-flop so that this channel cannot make further input requests. Third, the current address is updated in accordance with the value of the count control portion G and the half word count bit H. If $H=0$, indicating that the input data now awaiting storage in memory to be stored in the lower half of the current address, the current address portion of the control word is not modified before the control word is restored in memory. Thus, on the next input operation the current address will be the same. However, since H will be equal to one on the next input operation, the input data will be stored in the upper half of the memory location.

If $H=1$, indicating that the input data now awaiting storage in memory is to be stored in the upper half of the current address, the current address portion of the control word must be incremented or decremented by one so that on the next input operation the input data will be stored in the lowerhalf of the next consecutive memory location. The current address is incremented or decremented depending upon the value of the G bits. The G bits are not modified during an input or output buffer operation.

Output transfers of data are accomplished in substantially the same way as the input transfer described above. The primary differences are that the peripheral unit presents an output request signal to the central processor, a half word of data is read out of the processor memory to an output buffer register, and an output acknowledge signal is set to the peripheral unit. The updating of the control word is the same for output transfers as for input transfers.

The circuit of FIGS. 1A and 1B will now be described in connection with an input operation involving peripheral unit PU–1. It is assumed that Output Buffer instruction has been executed for input channel 1 which has loaded the buffer control word into a specified address in memory 5 and has conditioned the In Active flip-flop for channel 1. Furthermore, it is assumed that the mode switch 17 for PU–1 has been set to the ESI mode position. At some point in time the peripheral unit PU–1 applies an input word having the format shown in FIG. 2 to the input channel 1—1. The data portion of the input word is applied to the upper half of a set of gated amplifiers 3–1, while the control word address portion of the input word is applied to the lower half of the same set of gated amplifiers. When the input word is loaded onto the input channel 1—1 the peripheral unit PU–1 applies an In Request signal over the lead 7–1 to the priority circuits 15. The priority circuits 15 are continuously scanning the input and output request lines from all peripheral units and selectively allotting priority to the units under the control of the command generator. As explained in copending application A, an indeterminate number of cycles of the command generator may elapse before a cycle occurs in which it is determined that the input request from PU–1 has the highest priority. At time 5.4 of this cycle (see FIG. 5) the priority circuits apply a signal to the command generator indicating that the transfer operation is to take place in the ESI mode. The priority circuits also produce the command In Channel 1 Select on lead 21 and this command is applied to the gated amplifiers 3–1. The In Channel 1 Select command conditions the gated amplifiers so that the input word on channel 1—1 is gated into the central processor. The control word address portion of the input word is applied over a buss 23 to a register designated R1.

The ESI mode signal applied to the command generator at time 5.4 causes a command generator to initiate the sequence of three cycles RC, WC, and R/W as shown in FIG. 5. At time RC1.3 the command generator produces the signal Clear R1 which is applied to the R1 register to clear it in preparation for receiving the control word address from the gated amplifiers. At time RC2.1 the command generator produces the command $GA_L$ to R1 which is applied to a set of input gates to the R1 register. This command conditions the gates so that the control word address on buss 23 is gated into the R1 register.

At time RC2.3 the command generator produces the command Initiate Memory which is applied to the memory control circuits thereby initiating a memory cycle. At the same time, the command generator produces the command R1 to S which is applied to a set of gates on the input of a memory address register designated S. A transfer buss 25 connects the outputs of R1 to these gates and upon occurrence of the command R1 to S the control word address is gated into the S register in a double-gated transfer. Signals representing the contents of the S register are applied over a buss 27 to the memory thereby selecting the memory address containing the control word associated with input channel 1—1. The memory controls cycle the memory to read the control word out of the memory to a memory buffer register. The memory buffer register has 36 binary stages with the lower 18 stages being designated $Z_L$ and the upper 18 stages being designated $Z_U$.

The output from each stage of $Z_L$ is connected by means of a buss 29 to the input of the corresponding stage of a register designated $R_0$ while the output from each stage of $Z_U$ is connected by means of a buss 31 to the input of the corresponding stage of a register designated W5. At time RC4.4 the command generator produces the commands Clear R0 and Clear W5. The command Clear R0 is applied to the R0 register to clear it while the command Clear W5 is applied to the W5 register to clear it. At time RC5.3 the command generator produces the commands $Z_L$ to R0 and $Z_U$ to W5. The command $Z_L$ to R0 is applied to a set of input gates for the R0 register and conditions these gates so that the current address portion of the control word is gated into the R0 register from $Z_L$. The command $Z_U$ to W5 is applied to a set of input gates for the W5 register, and it conditions these gates so that the G, H, and word count portions of the control word are gated into the W5 register from $Z_U$. The word count is contained in bit positions 18 through 32 of W5 while H is contained in bit position 33 and G is contained in bit positions 34 and 35.

Having read the control word from memory, it is now necessary to update the control word and return it to memory. This means that the word count portion must be decremented by 1, the value of the H bit must be changed, and the current address portion must be modified.

The word count portion of the control word is decremented in the following manner. The word count in bit positions 18 through 32 of W5 is transferred over a buss 33 to a register designated W3. At WC1.1 the command generator produces the command Clear W3 and at time WC1.3 produces the command W5 to W3 which is applied to a set of input gates of the W3 register thereby conditioning these gates and entering the word count into the register. The command generator also produces a signal to Clear W1 and WC1.1 and at time WC1.3 produces the command −1 to W1. This latter command is applied to the various stages of W1 to set the value −1 into the register.

The output of each stage of W3 is connected over a buss 35 to one set of inputs of corresponding stages of an index adder 37. The output of each stage of W1 is connected over a buss 39 to a second set of inputs of corresponding stages of the index adder. The index adder continuously presents at its output the sum of the values in W1 and W3 and this sum is applied over a buss 41 to the W5 register. At time 1.4 the command generator produces the command Clear W5 (18–33) to clear the old value of the H bit and the word count out of W5 and at time WC2.3 the command generator produces the command IA to W5 which is applied to a set of input gates of the W5 register thereby gating the decremented word count back into the W5 register.

When the upper half of the control word is read out of memory into W5, the H bit is entered into bit position 33 of W5. This bit is updated and restored in W5 simultaneously with the decrementing of the word count. However, the value of the H bit before updating is the one subsequently used to gate data into or out of memory. Therefore, it is necessary to store the value of the H bit before it is modified.

A flip-flop H′ is used to store the unmodified value of H. The flip-flop H′ is connected by means of leads 43 and 45 to the outputs of stage 33 of W5. These outputs are further conditioned by the command H to H′ which is produced by the command generator at WC1.2. Upon occurrence of this command the value in W5–33 is double-gated into the H′ flip-flop.

The output from the zero side of the H′ flip-flop is connected by means of lead 47 to the 1's side of the flip-flop in stage 33 of the W5 register. The signals on lead 47 is applied to an AND gate (not shown) which is further conditioned by the command $\overline{H'}$ to H. This command is generated at WC2.3 simultaneously with the occurrence of the command IA to W5. Therefore, the complement of the value in the H′ flip-flop is gated back into stage 33 of W5 at the same time that the decremented word count is entered into stages 18 through 32.

It should be noted at this point that W5 is cleared immediately before the upper half of the control word is entered therein from $Z_U$. When the upper half of the control enters W5, the count control bits G are stored in bit positions 34 and 35. Stages 34 and 35 of the W5 register are not cleared by the command Clear W5 (18–33) which clears the lower stages 18 through 33 of the register at WC1.4 prior to enter of the updated word count and the updated H bit therein. Therefore, when the updated word count and H bit are entered back into W5 the G bits are still stored therein and the upper half of the control word is ready to be returned to memory.

At the same time the upper half of the control word was transferred from $Z_U$ to W5, the lower half of the control word containing the current address was transferred into the R0 register. The current address has been retained in the R0 register during the interval that the H bit and word count were updated. This is necessary since the Index Adder 37 used to decrement the word count is also used to modify the current address.

The content of the R0 register is continuously applied over a buss 51 to a set of input gates to the W1 register. At time WC2.4 the command generator produces the command Clear W1 to clear the register and at time WC3.2 the command generator produces the command R0 to W1 which conditions the input gates thereby entering the current address into the W1 register.

As previously explained, the amount by which the current address is modified is determined by the G and H portions of the control word. By the time the current address is entered into W1 the H portion has been updated. However, the value of H before modification is available from the H' flip-flop. The output signals from stages 34 and 35 of W5, representing the value of G are applied over a pair of leads 53 and 55 to a modifier circuit 57. The output of the H' flip-flop is also applied to circuit 57.

The modifier determining circuit 57 functions to produce output signals in accordance with the chart shown in FIG. 4. If H' is a one and G has the value 00, the circuit produces an increment output signal indicating that the current address should be incremented by 1. If H' is a 1 and G has the value 10 then the circuit produces a decrement signal indicating that the current address should be decremented by 1. For all other combinations of G and H' the circuit 55 fails to produce an output signal.

The W3 register is cleared at time WC2.4 by a command from the command generator. The increment and decrement output signals from the circuit 57 are applied by way of a pair of leads 59 and 61 to input gates associated with W3. At time WC3.2 the command generator produces a command Δ to W3 which further conditions these gates. If the modified determining circuit is producing a decrement signal at this time the stages of W3 are set to represent the value −1 and if the circuit is producing the increment signal the stages of W3 are set to represent the value +1. If the modifier circuit fails to produce either an increment or a decrement signal then the W3 register remains clear to represent a 0 modifier.

The modifier in W3 is applied to one set of inputs of the index adder and the current address in W1 is applied to the second set of inputs. The Index Adder produces the sum of these values and the sum is applied to the buss 63.

At this point the upper half of the updated control word is present in W5 and is being applied over a transfer buss 65 to input gates for $Z_U$ and the updated lower half of the control word is being applied to input gates of $Z_L$ over the transfer buss 63. At time WC3.4 the command generator produces the commands W5 to $Z_U$ and IA to $Z_L$. These commands gate the updated control word into $Z_U$ and $Z_L$ and the control word is restored in the memory 5 under the control of the memory control circuits. The memory controls are actually started by a Memory Initiate signal produced by the command generator at WC2.3.

The updated control word is restored to the same memory address from which the original control word was read. The control word address entered into R1 at RC2.1 is retained in that register. At time WC2.3 it is gated into the memory address register simultaneously with the occurrence of the Memory Initiate command.

Once the control word has been updated and returned to memory, the current address portion of the control word is transferred to the memory address register in preparation for reading in a data word. The value of the current address before modification is present in the R0 register. The output of the R0 register is applied over a buss 67 to a set of input gates for a register designated R2. The command generator produces a command to clear the R2 register at time R/W1.3. At time R/W2.1 the command generator produces the command R0 to R2 which conditions the input gates of R2 and enters the current address into the register. The output of the R2 register is applied by means of a buss 69 to a set of input gates of the memory address register S. At time R/W2.3 the command generator produces the command R2 to S thereby conditioning these gates and entering the current address into the register. This is a double-gated transfer hence it is not necessary to clear the S register before the current address is entered therein.

At the same time the current address is entered into the S register the command generator produces the command initiate memory to start another memory cycle. The purpose of this memory cycle is to store the half word of data available at the output of the upper half of gated amplifiers 3–1 in the memory location specified by the current address applied to the memory by the S register. The half word of input data is to be stored in either the upper half or lower half of this memory location depending upon the value of H read out of memory during the RC cycle. The value of H is available in the H' flip-flop which produces the signal H' if H was a 1 and the signal $\overline{H'}$ if H was a 0. The signal H' is applied to a first set of gates 71 having their outputs connected by means of a buss 73 to the $Z_U$ register and the signal $\overline{H'}$ is applied to a second set of gates 75 having their outputs connected by means of a buss 77 to $Z_L$. The outputs from the 18 upper stages of the gated amplifiers 3–1 are connected by means of a buss 79 to the inputs of both sets of gates 71 and 75. Actually, the outputs from the upper half of each set of gated amplifiers are transferred over the buss 79 but since input channel 1 has been allotted priority the gated amplifiers 3–1 are the only ones producing data signals on the bus 79. The command generator produces the command GA to Z which is applied to both sets of gates 71 and 75. Therefore, if H (H') is equal to 1 the data in the upper half of gated amplifiers 3–1 is double-gated through gates 71 to $Z_U$ and is stored in the upper half of the memory location specified by the current address. On the other hand, if H (H') is equal to 0 the signal $\overline{H'}$ double-gates the data through gates 75 to $Z_L$ and the data is stored in the lower half of the memory location specified by the current address. This completes the data input transfer.

At time 2.2 of the cycle following the R/W cycle the command generator applies an acknowledge signal to the priority circuits 15. The priority circuits route this signal onto the lead 9–1 as an Input Acknowledge signal. This signal tells the peripheral unit PU–1 that the data present on the channel 1—1 has been stored hence the data may be removed from the channel.

One or more input or output operations involving other peripheral units may take place before PU–1 again makes an input request. When this input request is made the circuits of FIGS. 1A and 1B go through a cycle of operations as described above the only difference being that the updated control words returned to memory during the previous WC cycle is used.

The word count portion of the control word is decremented by 1 during the WC cycle each time an input request is honored. When this value reaches 0 it is an indication that no further transfers can take place under the control of the present control word. The decremented word count is returned to the W5 register at time WC2.3 of each updating operation and remains in the register during the following R/W cycle. A zero test circuit 81 is connected by means of a buss 83 to the outputs of stages 18 through 32 of the W5 register. At time R/W3.2 the command generator produces the command Test on the lead 83 and if the word count is zero the zero test circuit produces a signal on lead 85 which is applied to the priority circuits 15 to reset the In Active flip-flop of the associated input channel. This prevents further input requests from the channel from being sensed by the priority circuits.

If the word count is zero at the time a control word is read out of memory during the RC cycle an error condition exists. The word count is read out of memory into the W5 register at RC5.3 and is still available in W5 at time WC1.2. At this time the command generator produces the signal Test on lead 87 and if the word count is zero the zero test circuit produces a signal on lead 89 which is applied to the command generator. The command generator proceeds through the R/W cycle but does not initiate a memory cycle. This prevents data from being entered into the memory during the R/W cycle.

Data output transfers occur in substantially the same manner as the input transfers described above. However, there are certain differences which will now be described in connection with an output request from the peripheral unit PU–N. When the peripheral unit PU–N is ready to accept data from the computer it loads an input word on the input channel 1–N and applies an Output Request signal to the priority circuits 15 over the lead 11–N. Since this is an Output Request the input word contains a control word address in the lower half but the upper half may be empty.

When the output request on lead 11–N is honored by the priority circuits a signal is sent to the command generator to initiate the sequence of three cycles shown in FIG. 5. Also, the priority circuits produce the signal Out Channel N Select on lead 91 which conditions the gated amplifiers 3–N and gates the input word through the amplifiers. The control word address is gated through the lower half of the gated amplifiers and passes over the buss 23 to the R1 register. The reading of the control word from memory, the updating of the control word, and the reading of the control word back into memory are all accomplished in the same manner as for an input operation. The current address portion of the control word is transferred from R0 through R2 to the S register to address the memory and the command generator produces the command Initiate Memory at Time R/W2.3 to initiate a memory cycle during which the word at the memory location specified by the current address is read out to the memory buffer register. The half word in the upper 18 positions of this address enters $Z_U$ while the half word contained in the lower 18 positions enters $Z_L$. The output of $Z_L$ is connected by means of a buss 93 to a first set of gates 95 and the output of $Z_U$ is connected by means of a buss 97 to a second set of gates 99. The signal $\overline{H'}$ is applied to each of the gates 95 and the signal H′ is applied to each of the gates 99. At time R/W5.4 the command generator produces the command Z to $OBR_L$ and this command is applied to both sets of gates 95 and 99. If $\overline{H'}$ equals 1 then at R/W5.4 the half word of data in $Z_L$ is double-gated through the gates 95 and over a buss 101 to the eighteen lower order stages of an output buffer register 103. On the other hand, if H′ equals 1 then the half word of data in $Z_U$ is gated through the gates 99 and over a buss 105 to the eighteen low order stages of the output buffer register. The content of the output buffer register is applied over a plurality of output channels 107 to each output device, FIG. 1B showing the output buffer register as being connected over the output channel 107–N to the peripheral unit PU–N. At time 2.2 of the cycle following the R/W cycle, the command generator produces an Output Acknowledge signal which is routed by the priority circuits so that it passes over the lead 13–N to peripheral unit PU–N. This signal tells the peripheral unit that the output data it requested is now available for acceptance.

The operation of the present invention may be briefly summarized in connection with the following specific numerical example. Assume that it is desired to pack three 18-bit half words into the memory beginning with the lower half of memory address 500. Assume further that the half words are to be packed in the memory locations in ascending addresses and that the control word for peripheral unit PU–1 is stored in memory location 250. The control word contains the value 500 in its current address portion since this is the memory location into which the first half word is to be entered. The H bit of the control word is a zero since the first half word is to be entered into the lower half of memory location 500. The word count portion of the control word contains the value 3 since three half words are to be transferred. The G portion of the control word has the value 00 to indicate that the half words are to be packed in ascending locations in memory. Each input word from PU–1 will contain the value 250 in the lower half thereof in order to address memory location 250 and withdraw the control word.

When the first input request from PU–1 is honored the address 250 is gated through R1 to the S register and the control word having the values specified above is read out to the Z register. The current address (500) is entered into R0. The G, H, and word count portions are entered into the W5 register. The word count (3) is gated into W3 and the W1 register is set to −1. The undated word count (2) is now gated back into W5. At the same time the word count is decremented the value of the H bit (0) is stored in the H′ flip-flop and the complement of this value (1) is gated back into W5.

With G equal to 00 and H′ also equal to 0, FIG. 4 indicates that the current address should not be modified. Therefore, the W3 register is cleared and the current address is gated from R0 through W1 to the Index Adder. The updated control word is now returned to memory. The values in the updated control word are $G=00$, $H=1$, Word Count=3, and Current Address=500.

The current address (500) retained in R0 is transferred from R0 through R2 to the S register to address memory for the purpose of storing the first half word. This half word is applied to both sets of gates 71 and 75 but since signal $\overline{H'}$ is up as the result of a 0 value being stored in the H′ flip-flop, the data is gated through gates 75 and into $Z_L$ so that it is stored in the lower half of memory location 500.

When the second input request from PU–1 is honored, the control word address (250) is gated through R1 to the S register to again withdraw the control word stored at this address. The current address (500) is again transferred from $Z_L$ to the R0 register. The G, H, and word count portions are entered into W5. The word count (2) is entered into W3 and the value −1 is set into the W1 register. The updated word count (1) is returned to the W5 register. At the same time the word count is updated, the value of H (1) is stored in the H′ flip-flop and the complement of this value (0) is restored in the W5 register.

At this point G has the value 00 and $H'=1$. The chart in FIG. 4 shows that under these conditions the current address should be incremented by 1. The current address (500) is read out of R0 into the W1 register and the modifier circuit 57 produces a signal to set the value +1 into the W3 register. The Index Adder forms the sum of these two values and presents the value of the updated current address (501) at its output. The updated control word is now returned to memory. As returned to memory, the G portion of the control word has the value 00, the H portion has the value 0, the word count portion has the value 1, and the current address portion has the value 501.

The current address (500) retained in R0 is gated through R2 to the S register and applied to the memory to again select this memory location for receiving the second half word of data from the peripheral unit. The half word of input data is applied to both sets of gates 71 and 75 but since H′ equal 1, the half word is gated through gates 71 to the $Z_U$ register from which it is stored in the upper half of memory location 500. At this point the first half word of input data is contained in the lower half of memory location 500 and the second half word is contained in the upper half.

When the third input request from PU–1 is honored the address 250 is again transferred through R1 to the S register to withdraw the control word from memory. The current address portion (501) is read out through $Z_L$ to the R0 register. The G, H, and word count portions are read out through $Z_U$ to the W5 register. The word count portion (1) is read out of W5 to the W3 register and the value −1 is set into W1. The Index Adder forms the sum of these two values and gates the updated word count (now 0) into the W5 register. At the same time the word count is being updated, the value of H (0) is entered into the H′ flip-flop and the complement of this value (1) is transferred back into W5.

At this point G has the value 00 and H′ also has the value 0 hence according to FIG. 4 the current address portion of the control word should not be incremented. The W3 register is cleared and the current address (501) is gated from R0 through W1 and the Index Adder. The control word is now restored in memory with the G portion having the value 00, the H portion having the value 1, the word count having the value 0, and the current address portion having the value 501.

The current address (501) retained in R0 is gated from R0 through R2 to the S register and applied to memory to select memory address 501 for receiving the third half word of data. The incoming half word of data is applied to both sets of gates 71 and 75 but since H′ equals 0 the signal $\overline{H'}$ gates the half word of data through gates 75 to $Z_L$ so that it is stored in the lower half of memory location 501.

During the last updating operation the word count was reduced to 0 and entered into the W5 register. The zero test circuit 81 recognizes this condition and upon occurrence of the test signal on lead 83 the zero test circuit produces an output signal on lead 85 to reset the In Active flip-flop associated with PU–1. This prevents the priority circuits from recognizing further input requests from the peripheral unit.

From the above description it is seen that the present invention provides means for performing ESI transfers of half words and automatically packing the half words alternately into lower and upper storage locations. Transfers to or from memory addresses may occur in either ascending or descending order of addresses depending upon whether G has the value 00 or 10. The first half word may be entered into either the upper half or the lower half of the current address depending upon the initial value of the H bit of the control word. However, if a particular transfer is made to or from the upper half of a memory location then the next transfer involving the same control word is made to or from the lower half of either the next higher or the next lower memory location.

For the sake of clarity the present invention has been described in connection with a preferred simplified embodiment in which the R/W cycle (see FIG. 4) follows the WC cycle. In a large scale system employing plural memories it may be possible to execute the WC and R/W cycles simultaneously. In this case some means must be provided for determining whether or not the data transfer is to or from the same memory bank in which the control word is stored. If the control word is contained in the same memory bank as that involved in the data transfer then the two cycles must be executed in sequence as shown in FIG. 5. Otherwise, they may be executed concurrently.

In some instances it may be undesirable to tie up the central processor memory for the three (or two) consecutive cycles required to complete an ESI transfer. Therefore, in some systems utilizing the present invention means may be provided for sensing non-ESI data requests having higher priority than the ESI operation being performed, then holding up the ESI operation until the non-ESI request of higher priority has been serviced. Other modifications falling within the spirit and scope of the appended claims will be obvious from the foregoing description.

The embodiments of the invention in which an exclusive property or privilege is claimed are defined as follows:

1. A data processing system comprising:

a peripheral unit;

a central processor;

transfer channel means interconnecting said peripheral unit and said central processor for the transfer of data therebetween;

said peripheral unit including means for applying a control word address to said transfer channel means;

said central processor including memory means for storing data words and a control word at addressable locations;

memory addressing means including means responsive to the control word address on said transfer channel for withdrawing said control word from said memory;

said control word having a current address portion and a half word count bit portion;

means for modifying the current address portion of said control word when said half word count bit has a first value;

means for modifying said half word count bit each time the control word is withdrawn from memory so that it alternately has a first value and a second value;

said memory addressing means including means for addressing said memory to return the modified control word to the address from which it was withdrawn;

means for applying the current address portion of said control word to said addressing means;

and gating means connecting said memory means to said transfer channel means;

said gating means including a first set of gates responsive to said half word count bit when it has said first value for gating data between said transfer channel means and the upper half of the memory location addressed by the current address portion of said control word;

said gating means including a second set of gates responsive to said half word count bit when it has said second value for gating data between said transfer channel means and the lower half of the memory location addressed by the current address portion of said control word.

2. A data processing system as claimed in claim 1 wherein, said control word contains a count control portion for controlling the modification of said current address portion of said control word;

said means for modifying said current address portion including means responsive to said half word count bit when it has said first value for incrementing said current address portion when said count control portion has a first value and decrementing said current address portion when said count control portion has a second value.

3. A data processing system as claimed in claim 1 wherein, said control word contains a word count portion designating the number of transfers to be made under control of the control word;

the means in said peripheral unit for applying a control word address to said transfer channel means including means for repetitively applying the same control word address to said transfer channel means each time a transfer of data between said memory means and said peripheral unit is desired;

means for decrementing said word count portion when said control word is withdrawn from said memory means;

and means for sensing when said word count portion has a zero value after being decremented.

4. A data processing system comprising:

an addressable memory for storing data words and a control word;

said control word having a current address portion, a word count portion, and a half word count bit;

an input channel;

a peripheral unit for repeatedly placing a half word of data and the address of said control word on said input channel;

said peripheral unit including means for producing an input request signal each time a half word of data and said control word address are placed on said input channel;

addressing means;

means responsive to each input request signal for applying said control word address to said addressing means to withdraw said control word from said memory;

means for changing said half word count bit each time said control word is withdrawn from said memory;

means for decrementing said word count portion each time said control word is withdrawn from said memory;

means for modifying said current address portion when said control word is withdrawn from memory said means being responsive to said half word count bit for modifying said current address portion only when said half word count bit has a first value;

means restoring said control word in said control word address after it has been modified;

means for applying the current address portion of said control word to said addressing means to select an address for storing data;

first gating means responsive to said half word count bit when it has said first value for gating a half word of data from said input channel to the upper half of the memory address specified by said current address portion of said control word;

second gating means responsive to said half word count bit when it has a second value for gating a half word of data from said input channel to the lower half of the memory address specified by said current address portion of said control word;

means for testing the value of said word count each time it is decremented;

and means responsive to said testing means for inhibiting response to said input requests after said word count reaches a predetermined value.

5. A data processing device as claimed in claim 4 wherein, said control word contains a count control portion;

said current address modifying means including means responsive to said count control portion for incrementing said current address when said half word count bit has said first value and said count control portion has one value and decrementing said current address when said half word count bit has said first value and said count control portion has another value.

6. A data processing system comprising:

an addressable memory for storing data words and a control word;

said control word having a current address portion, a word count portion, and a half word count bit;

an input channel and an output channel;

a peripheral unit for repeatedly placing the address of said control word on said input channel;

said peripheral unit including means for producing an output request signal each time said control word address is placed on said input channel;

addressing means;

means responsive to each output request signal for applying said control word address to said addressing means to withdraw said control word from said memory;

means for changing said half word count bit each time said control word is withdrawn from said memory;

means for decrementing said word count portion each time said control word is withdrawn from said memory;

means for modifying said current address portion when said control word is withdrawn from memory, said means being responsive to said half word count bit for modifying said current address portion only when said half word count bit has a first value;

means restoring said control word in said control word address after it has been modified;

means for applying the current address portion of said control word to said addressing means to select an address for storing data;

first gating means responsive to said half word count bit when it has said first value for gating a half word of data to said output channel from the upper half of the memory address specified by said current address portion of said control word;

second gating means responsive to said half word count bit when it has a second value for gating a half word of data to said output channel from the upper half of the memory address specified by said current address portion of said control word;

means for testing the value of said word count each time it is decremented;

and means responsive to said testing means for inhibiting response to said output requests after said word count reaches a predetermined value.

7. A data processing device as claimed in claim 6 wherein, said control word contains a count control portion, said current address modifying means including means responsive to said count control portion for incrementing said current address when said half word count bit has said first value and said count control portion has one value and decrementing said current address when said half word count bit has said first value and said count control portion has another value.

8. A data processing system comprising:

an addressable memory for storing data words and control words at addressable locations;

each of said control words including a current address, a half word count bit, and a word count, first gating means for selectively gating half words of data to the upper halves of said addressable locations;

second gating means for selectively gating half words of data to the lower halves of said addressable locations;

memory addressing means;

input channel means connected to said first and second gating means and said memory addressing means;

a peripheral unit for applying an input word to said input channel means, said input word including data and a control word address;

said peripheral unit including means for generating an input request when it applies an input word to said input channel means, cycle control means, said control means including means responsive to said input request for applying said control word address to said memory addressing means to withdraw a control word from memory and subsequently restore it;

register means for storing the control word withdrawn from memory;

means responsive to said register means for decrementing the word count portion of the control word withdrawn and returning it to said register means;

means responsive to said register means for changing the value of said half word count bit and returning it to said register means;

modifier circuit means responsive to said register means for modifying the current address in the control word withdrawn from memory when said half word count bit has a first value;

means connecting said register means and said modifier means to said memory for storage of the modified control word;

means connecting said register means to said addressing means for addressing the memory location specified by the current address of the control word withdrawn from memory;

means for conditioning said first gating means when said half word count bit has said first value;

and means for conditioning said second gating means when said half word count bit has a second value.

9. A data processing system comprising:

a memory for storing data and control words at addressable locations;

a memory buffer register having an upper half and a lower half;

a source of half-words of data;

first means connecting said source to the upper half of said memory buffer register;

second means connecting said source to the lower half of said memory buffer register;

a source of control word addresses;

third means responsive to said source of control word addresses for withdrawing control words from said memory;

each control word having a current address and a half word count bit;

fourth means responsive to the current address of a control word withdrawn from memory for addressing said memory;

and fifth means responsive to the half word count bit of a control word withdrawn from memory for enabling said first means when said half word count bit has a first value and enabling said second means when said half word count bit has a second value.

10. A data processing system as claimed in claim 9 wherein said control words each include a word count, said data processing system further comprising:

sixth means responsive to the half word count bit of a control word withdrawn from memory for producing a modified half word count bit;

seventh means for decrementing the word count of a control word withdrawn from memory to produce a modified word count;

eighth means responsive to the half word count bit and current address of a control word withdrawn from memory for producing a modified current address when the word count bit has a first value;

ninth means for returning a control word to its memory location after the current address, half word count bit and word count have been modified.

11. A data processing system as claimed in claim 10 wherein:

said source of half words of data and said source of control word addresses comprise a peripheral unit having means for producing an input request signal when it produces a control word address;

said source of control word addresses further comprising a second peripheral unit having means for producing an output request signal when it produces a control word address;

an output buffer register having an upper half and a lower half;

tenth means connecting the upper half of said memory buffer register to the lower half of said output buffer register;

eleventh means connecting the lower half of said memory buffer register to the lower half of said output buffer register;

said fifth means being connected to said tenth and eleventh means to enable said tenth means when said half word count bit has said first value and enable said eleventh means when said half word count bit has said second value;

and command generator means responsive to an input request signal for further enabling said first and second means and responsive to an output request signal for further enabling said tenth and eleventh means.

12. A data processing system as claimed in claim 11 and further including:

means for testing each decremented word count for a zero value and means responsive to said testing means for blocking further request signals from the peripheral unit which supplied the address of the control word whose decrement word count is a zero value.

References Cited

UNITED STATES PATENTS

| | | | |
|---|---|---|---|
| 3,015,441 | 1/1962 | Rent et al. | 235—157 |
| 3,094,610 | 6/1963 | Humphrey, et al. | 235—157 |
| 3,243,781 | 3/1966 | Ehrman et al. | 340—172.5 |

ROBERT C. BAILEY, *Primary Examiner.*

I. S. KAVRUKOV, *Assistant Examiner.*